Patented Feb. 17, 1931

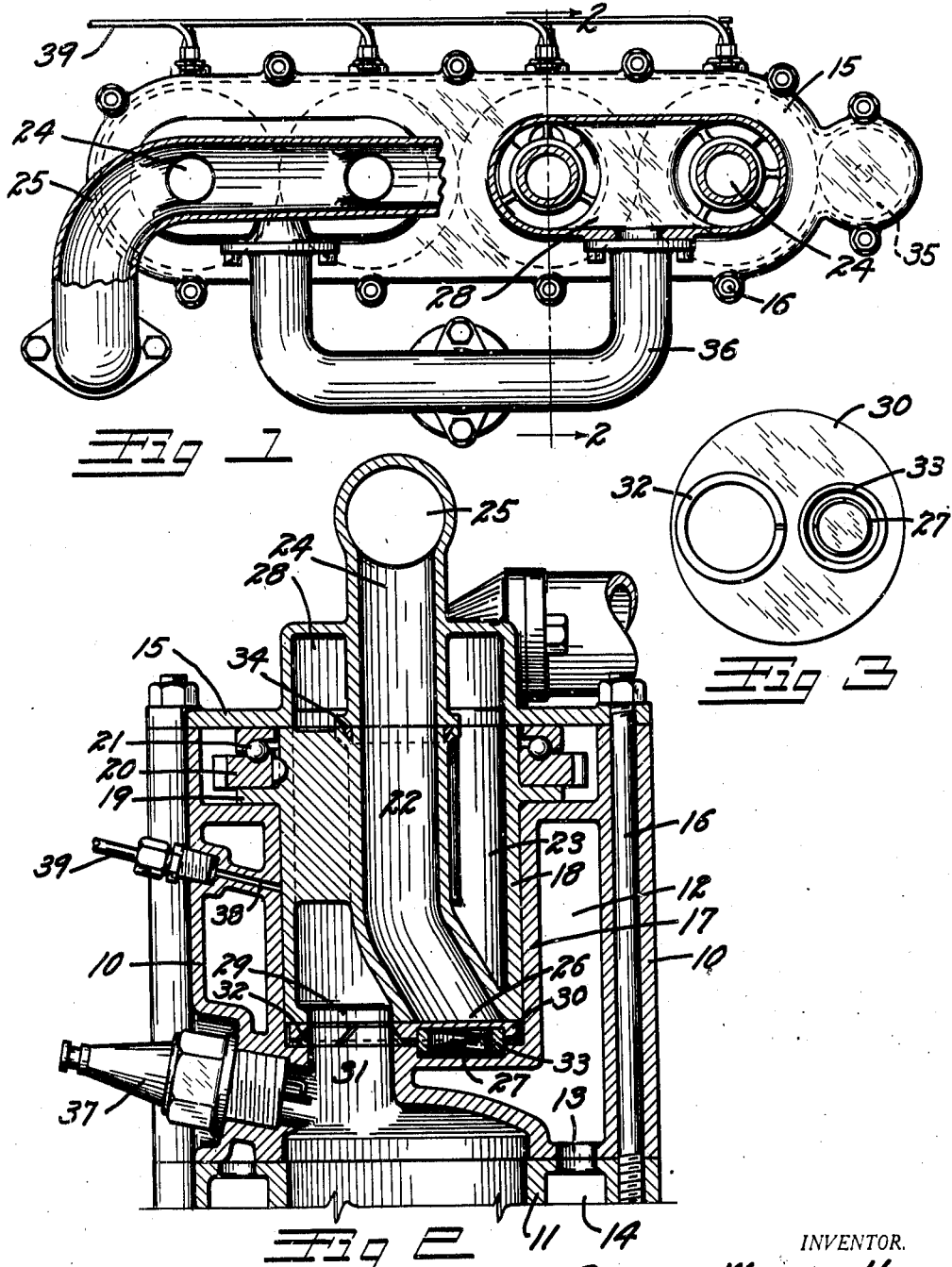

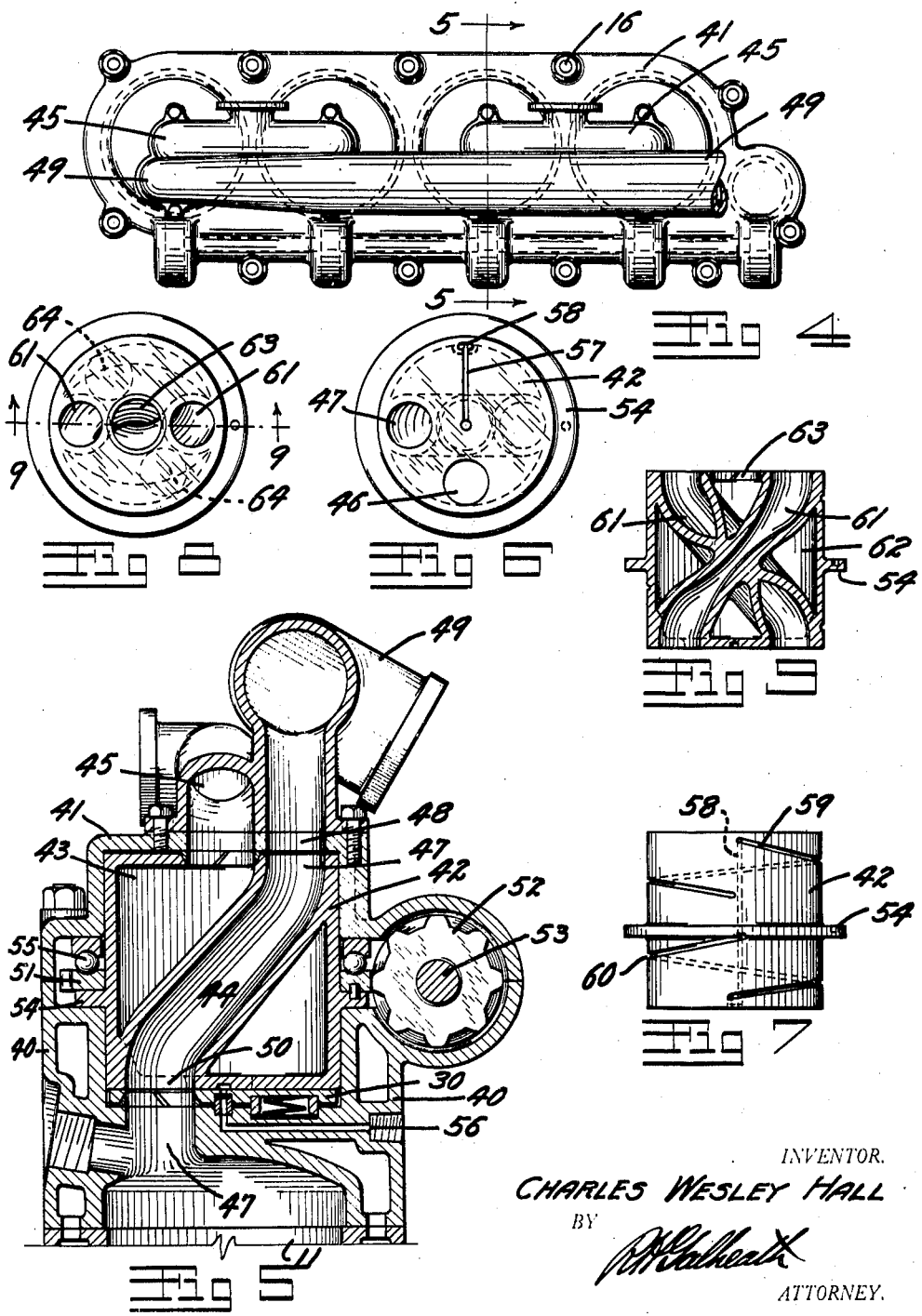

1,792,689

UNITED STATES PATENT OFFICE

CHARLES WESLEY HALL, OF DENVER, COLORADO, ASSIGNOR TO HALL ROTARY VALVE MOTOR COMPANY, OF DENVER, COLORADO

INTERNAL-COMBUSTION ENGINE

Application filed July 2, 1928, Serial No. 289,740. Renewed April 5, 1930.

This invention relates to an improved valve construction for internal combustion engines. Tappet valves as at present used in internal combustion engines will not operate efficiently at high speeds and will not operate at all at excessively high speeds. The principal object of this invention is to provide a valve which will operate efficiently at all engine speeds so that an excessively high engine speed can be developed.

Another object of the invention is to provide a rotary valve in the head of the engine, where it will offer but little resistance to the intaking and exhausting gases, and to eliminate sharp bends in the passages so that the cylinder can be quickly filled and quickly scavenged and a high speed developed.

Another object of the invention is to so construct the rotary valve that the exhaust passage therein will be jacketed within the intake passage thus creating a cooling jacket of incoming gas about the hot exhaust gases. This not only reduces the temperature of the valve but acts to raise the temperature of the incoming gases so as to produce a more efficient combustion.

Still another object of the invention is to provide a simple and efficient means which will keep the valve seats tight at all times and accommodate wear thereon.

A further object is to provide an efficient oiling mechanism for rotary valves.

A still further object is to so construct the valve mechanism that it can be easily attached to the usual type of engine block without requiring any changes in the block proper. This allows it to be quickly and easily installed as a unit upon present engines.

Other objects and advantages reside in the detail construction of the invention, which is designed for simplicity, economy, and efficiency. These will become more apparent from the following detailed description.

In the following detailed description of the invention reference is had to the accompanying drawings which forms a part hereof. Like numerals refer to like parts in all views of the drawing and throughout the description.

In the drawings:

Fig. 1 is a plan view of an engine block with my improved valve mechanism installed thereon. Portions of this view are in section to illustrate the interior construction.

Fig. 2 is a vertical section through the valve mechanism of one of the cylinders taken on the line 2—2, Fig. 1.

Fig. 3 is a detail face view of the sealing plate employed to keep the valve passages tight and to accommodate for any wear in the rotary valve.

Fig. 4 is a plan view of an alternate form of the invention in place upon an engine block.

Fig. 5 is a vertical cross section through the valve mechanism of the alternate form, taken on the line 5—5, Fig. 4.

Fig. 6 is a bottom view of the rotary valve employed in the alternate form of the invention.

Fig. 7 is a side elevation of the valve of Fig. 6.

Fig. 8 is a plan view of a second alternate form of valve which might be used in place of the valve of Fig. 6. With this form of the valve, however, the valve rotation speed would be reduced one-half.

Fig. 9 is a vertical cross section through the second alternate form of valve, taken on the line 9—9, Fig. 8.

The invention comprises a valve head casting 10 arranged to cover the entire engine block, which is indicated on the drawings at 11. The valve casting 10 is provided with water jacket space 12 communicating through ports 13 with the water jacket 14 of the engine block.

In the first form of the invention illustrated in Figs. 1 to 3, the valve casting 10 is held in place by means of a cap 15 which is clamped to the casting by relatively long stud bolts 16, extending into the regular stud holes in the engine block 11. The studs 16 are so positioned that the cap 15 and valve casting 10 can be secured to any desired type of engine block by screwing the studs 16 into the tapp openings usually occupied by the cylinder head studs.

The valve casting 10 is provided with a series of cylindrical valve sets 17. One of the seats being arranged over each of the cylinders in the block 11. A rotary valve 18 rotates within each of the seats 17. The valves 18 are supported on bearing flanges 19 which also support keyed ring gears 20. The ring gears 20 are separated from the cap 15 by means of ball thrust bearings 21.

Each of the rotary valves 18 contains a central exhaust passage 22 surrounded by an intake passage 23. The exhaust passage 22 opens at the center of the top of the valve 18 in alignment with a branch 24 of an exhaust manifold 25. As illustrated, the exhaust manifold 25 is cast as an integral part of the cap casting 15. It could, however, be a separate member if desired.

At the lower face of the rotary valve 18, the exhaust passage 22 opens to a side port 26, which registers with a valve passage 31, communicating with the engine cylinder at each revolution of the rotary valve 18. The intake passage 23 is open at all times to an intake chamber 28 in the cap 15 and at the lower face of the valve 18 opens through a port 29, which also registers with the valve passage 31 at each revolution of the rotary valve 18.

To prevent up-throw of the valve 18 when the explosion occurs in the engine cylinder and to keep the various frictional contacts tight, I provide a sealing plate 30, which is constantly forced against the bottom of the rotary valve by means of a compression spring 27 and a conical spring sealing ring 32.

The conical ring 32 surrounds the opening of the passage 31 and is so constructed that it constantly tends to expand. In so doing it forces its conical surface against the plate 30 so as to lift this plate against the valve 18. The spring 27 acts similarly to lift the opposite side of the plate. This causes the valve 18 to be in contact with the cap 15 at all times and keeps the thrust bearing 21 tight so that all knocking is eliminated.

The sealing plate 30 is prevented from rotating by means of a cylinder 33 which surrounds the spring 27 and projects partially into the plate 30 from the valve casting 10. A conical sealing ring 34 surrounds the exhaust opening at the top of the valve 18 to seal it at this point.

The ring gears 20 of adjacent valves mesh with each other, as indicated in broken line in Fig. 1. All of the gears are driven from a drive pinion 35, at one extremity of the casting 10. The valves 18 are arranged to rotate at one-half the crank shaft speed of the engine so that, as the piston moves downward in a cylinder, gas will be drawn from an intake manifold 36 into the intake chambers 28. It will flow from the chambers 28 through the intake passage 23 in the valve, through the port 29, and through the valve passage 31 to the cylinder.

The rotation of the valve will now close the port 29 allowing the gas to be compressed by the piston and exploded by means of a spark plug 37. As the explosion stroke is completed the port 26 will align with the valve passage 31 allowing the rising piston to force the exhaust gases through the passage 31, the exhaust passage 22, and the branch 24 into the exhaust manifold 25.

Oil is supplied to the rotary valves 18 through an oil port 38 communicating with any suitable oil pressure line 39. The rotation of the valve spreads the oil uniformly over its outer surface.

In the alternate form of the invention, a valve casting 40 is employed closed by means of a cap casting 41. Over each of the cylinders a rotary valve 42 is arranged which extends partially into the cap 41 and partially into the valve casting 40.

Each of the rotary valves 42 is provided with an intake chamber 43 through which an exhaust passage 44 diagonally passes. The intake chamber 43 opens through the top of the valve in a central port communicating with an intake manifold 45. At the bottom of the valve the intake chamber 43 opens through a side port 46 which registers with a cylinder passage 47 at each revolution of the valve. The exhaust passage 44 communicates through the top of the valve in a side port 47 which registers with an exhaust port 48 communicating with an exhaust manifold 49 at each revolution of the valve 42. At the bottom of the valve 42 the exhaust passage 44 terminates in a side port 50 which registers with the cylinder passage 47 at each revolution of the valve.

Each of the valves 42 is provided with a spiral ring gear 51 which meshes with a spiral pinion 52 upon a valve shaft 53 which extends throughout the length of the engine. The weight of the valve is supported on a flange 54 and a sealing plate and sealing ring and the thrust of the valve is absorbed in thrust bearings 55.

This form of the invention also employs the sealing plate 30 and sealing rings similar to the previously described form. The operation of this valve is also similar to the previously described form. The only difference in the two constructions is that in the alternate form the exhaust port leads diagonally through the intake chamber to a side port and allows the intake chamber to open to a central port in the top of the valve. The spiral form of drive of the alternate form could be incorporated into the preferred form if desired.

Oil is supplied to the valves 42 from an oil passage 56 which opens through the center of the sealing plate 30 into a radial channel 57, see Fig. 6, in the bottom of the valve. This channel leads the oil to a vertical passage 58 adjacent the wall of the valve 42 which opens to the top of an upper oil spiral 59 and a lower oil spiral 60. The spirals cause the oil to travel downwardly over the exterior of the valve 42 thereby efficiently lubricating all of the friction surfaces. The oil from the upper spiral will travel outwardly over the ring gears 51 thereby lubricating the drive mechanism.

If desired, the form of valve illustrated in Figs. 8 and 9 can be employed in place of the previously described valves. If this form is used, however, the valve is rotated at one-fourth engine speed instead of one-half, as with the previous forms. In this form of valve two diagonally crossed exhaust passages 61 are employed, surrounded by an intake chamber 62. The intake chamber opens at the top of the valve in a central port 63 and at the bottom of the valve in two side ports as indicated in broken line at 64, Fig. 8. With this form of the invention two exhaust ports and two intake ports will open to the cylinder passage 47, at each revolution of the valve. This form probably is more desirable in excessive high speed engines, since it reduces the valve speed of the engine.

It is desired to call attention to the fact that the valve chambers are in alignment with the cylinders so that no projections are formed beyond the engine block. The entire mechanism is easily accessible for renewal or repairs by simply removing the cap castings 15 or 41 thus releasing the complete valve and operating mechanism.

In both forms of the invention the sealing plates force the valve constantly upwardly so as to maintain the thrust bearings tight. The valves are so machined that when the peripherial supporting flanges are seated the contact between the cap plate and the valve will be relatively close say within .001 of an inch.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A rotary valve for an internal combustion engine cylinder comprising: a chamber arranged adjacent said cylinder; a passage communicating between said cylinder and said chamber; a valve member adapted to rotate in said chamber; an exhaust passage extending longitudinally through said valve; an intake passage extending longitudinally through said valve, one of said passages opening through the center of the one face of said valve, the other of said passages opening through said latter face to one side of said first passage; and ports opening through the other face of said valve to said passages, said ports adapted to alternately register with said passage to the cylinder.

2. A rotary valve for an internal combustion engine cylinder comprising: a chamber arranged adjacent said cylinder; a passage communicating between said cylinder and said chamber; a valve member adapted to rotate in said chamber; an exhaust passage extending longitudinally through said valve; an intake passage extending longitudinally through said valve, one of said passages opening through the center of the one face of said valve, the other of said passages opening through said latter face to one side of said first passage; and ports opening through the other face of said valve to said passages, said ports adapted to alternately register with said passage to the cylinder; and a ring gear surrounding said valve and arranged to rotate the same.

3. A rotary valve for an internal combustion engine cylinder comprising: a chamber arranged adjacent said cylinder; a passage communicating between said cylinder and said chamber; a valve member adapted to rotate in said chamber; an exhaust passage extending longitudinally through said valve; an intake passage extending longitudinally through said valve, one of said passages opening through the center of the one face of said valve, the other of said passages opening through said latter face to one side of said first passage; ports opening through the other face of said valve to said passages, said ports adapted to alternately register with said passage to the cylinder; a ring gear surrounding said valve and arranged to rotate the same; a flange surrounding said valve and arranged to support the weight thereof; a thrust bearing arranged to absorb the upthrust of said valve from said flange; and means for maintaining the valve mechanism against said thrust bearing comprising a sealing plate; a spring arranged to maintain said sealing plate against the bottom of said valve.

4. A rotary valve for an internal combustion engine cylinder comprising: a chamber arranged adjacent said cylinder; a passage communicating between said cylinder and said chamber; a valve member adapted to rotate in said chamber; an exhaust passage extending longitudinally through said valve; an intake passage extending longitudinally through said valve, one of said passages opening through the center of the one face of said valve, the other of said passages opening through said latter face to one side of said first passage; ports opening through the other face of said valve to said passages, said ports adapted to alternately register with said passage to the cylinder; a ring gear surrounding said valve and arranged to rotate the same; a flange surrounding said valve and arranged to support the weight thereof; a thrust bearing arranged to absorb the upthrust of said valve from said flange; and means for maintaining the valve mechanism against said thrust bearing comprising a sealing plate; a spring arranged to maintain said sealing plate against the bottom of said valve; and means for preventing said plate from rotating with said valve.

5. A rotary valve for an internal combustion engine cylinder comprising: a cylindrical chamber arranged above said cylinder; a passage communicating between said cylinder and said chamber; a cylindrical valve adapted to rotate in said chamber; an exhaust passage extending longitudinally through said valve; an intake passage extending longitudinally through said valve, one of said passages opening through the center of the upper face of said valve, the other of said passages opening through said upper face to one side of said first passage; ports opening through the lower face of said valve to said passages, said ports adapted to alternately register with said passage to the cylinder; a ring gear surrounding said valve and arranged to rotate the same; a peripheral flange surrounding said valve and arranged to support the weight thereof; a thrust bearing arranged to absorb the upthrust of said valve from said flange; means for maintaining the valve mechanism against said thrust bearing comprising a sealing plate; a spring arranged to maintain said sealing plate against the bottom of said valve; means for preventing said plate from rotating with said valve; said means comprising a cylinder surrounding said spring and projecting into said plate; and means for maintaining said cylinder in a fixed position.

6. A rotary valve for an internal combustion engine cylinder comprising: a vertically placed cylindrical valve member substantially in alignment with and of approximately the same diameter as said cylinder; an exhaust tube passing vertically through said member and opening to its upper and lower faces; and an intake chamber surrounding said exhaust tube said intake chamber also opening to the upper and lower faces of said member.

7. A rotary valve for an internal combustion engine cylinder comprising: a vertically placed cylindrical valve member substantially in alignment with and of approximately the same diameter as said cylinder; and exhaust tube passing vertically through said member and opening to its upper and lower faces; an intake chamber surrounding said exhaust tube, said intake chamber also opening to the upper and lower faces of said member; and a passage communicating with said cylinder, the openings in the lower faces of said member adapted to alternately register with said passage.

8. A rotary valve construction for an internal combustion engine block comprising a plurality of cylinders: a valve casting adapted to rest on said block; valve chambers formed in said valve casting over each cylinder in said block; a cylinder passage between each chamber and its adjacent cylinder; a valve member arranged to rotate in each of said chambers; an exhaust manifold above said valve chambers; an intake manifold above said valve chambers; exhaust passages communicating through the tops of said valve members with said exhaust manifold and arranged to register with said cylinder passages at predetermined times; intake chambers surrounding said exhaust passages within said valve members and communicating through the tops of said members with said intake manifold and through the bottoms of the members with said cylinder passages at predetermined times; and means for rotating said members.

9. Means for sealing a rotary valve of the type having parallel faces placed transversely of its axis of rotation and having passages therethrough and comprising: a sealing plate; means for forcing said plate against one of said faces, said plate having an opening corresponding to the passages to said valve; and a sealing ring embedded in said plate and surrounding said opening, said sealing ring being beveled so that in expanding it will force itself from said plate so as to urge said plate towards said valve.

10. Means for sealing a rotary valve of the type having parallel faces placed transversely of its axis of rotation comprising: a sealing plate; resilient means for forcing said plate against one of said surfaces and means for preventing said plate from rotating with said valve, said means comprising: a stop member projecting partially into said plate and affixed to a non-rotating support.

11. In a rotary valve having two parallel plane faces positioned at right angles to the axis of rotation; a passage within said valve communicating from the center of the first face to a position alongside of the center of the second face; and a second passage communicating from alongside of the center of said first face to a position alongside of the center of said second face.

12. A rotary valve comprising: a hollow closed member; plane faces at the extremities of said member at right angles to its axis of rotation; a first passage extending between the plane faces and opening at the axis of one of the faces and to one side of the axis of the other of the faces; and a second passage extending between the plane faces and opening to one side of the axis of each of said plane faces.

13. In a rotary valve having a traveling ported surface a sealing plate; and means in resilient contact with said sealing plate and registering with the port therein and arranged to force said plate against said surface.

In testimony whereof, I affix my signature.

CHARLES WESLEY HALL.